UNITED STATES PATENT OFFICE.

WILLIAM J. MENZIES, OF ST. HELENS, ENGLAND.

MANUFACTURE OF BICARBONATE OF SODA.

SPECIFICATION forming part of Letters Patent No. 227,561, dated May 11, 1880.

Application filed January 21, 1880.

*To all whom it may concern:*

Be it known that I, WILLIAM JONES MENZIES, of St. Helens, Lancashire, England, have discovered and invented certain Improvements in the Manufacture of Bicarbonate of Soda, of which the following is a specification.

Bicarbonate of soda manufactured by the so-called "ammonia process" has hitherto not been prepared of sufficient purity for sale as an ordinary commercial article, owing to its containing and being discolored by a certain amount of organic matter or coloring-matter of the aniline series derived from the ammonia used in its manufacture. Some ammonia, in the form of a sparingly soluble bicarbonate, is also left, combined with the bicarbonate of soda. Neither of these substances, owing to their sparing solubility in water, can be readily removed from the bicarbonate of soda by washing, thus rendering it unfit for use for most commercial purposes.

I have discovered that bicarbonate of soda in a dry state may, first, be heated to a considerable extent in a current of carbonic acid; or, second, hot carbonic-acid gas, or a mixture of air and carbonic-acid gas, may be passed through the bulk without the bicarbonate of soda suffering decomposition to any extent by losing its carbonic acid. Bicarbonate of soda in solution, however, if heated to any extent, is rapidly decomposed, losing its carbonic acid. I avail myself of this fact to remove the ammonia and, to a certain extent, the coloring-matter from bicarbonate of soda obtained by the ammonia process or otherwise, containing these impurities, by passing or drawing through or over the bulk, in a closed vessel, preferably a current of heated carbonic acid, or the heated gases produced from ordinary combustion of anthracite coal. In this way the bicarbonate of ammonia is removed from the bicarbonate of soda by volatilization, and passes off with the carbonic acid, when it can be collected by a suitable condensing apparatus, and the carbonic acid allowed to pass away or used again for the same operation. If the temperature is inadvertently or purposely raised, so that any of the bicarbonate of soda is decomposed, it can afterward be easily reconverted into bicarbonate by continuing the current of carbonic acid at a lower temperature after the removal of the ammonia and coloring-matter is completed. If necessary, the last traces of these impurities can afterward be completely removed by heating the bicarbonate of soda under pressure in a closed vessel, either with or without the admixture of a small quantity of some oxidizing agent, such as chlorate of potash, to facilitate the operation. The pressure is obtained by the heat decomposing a small quantity of the bicarbonate of soda and producing carbonic acid, which acts in the same way as the current of carbonic acid passed through the bulk, as mentioned above, and also, being assisted by the pressure, it prevents any further decomposition. In this way a considerable temperature can be obtained without the bicarbonate of soda being decomposed to any extent or unmanageable pressure being produced. The volatile coloring organic compounds are thus distilled off, and are allowed to pass through a suitable loaded safety-valve, which keeps up a constant pressure, or they are decomposed by the action of the heat or the oxidizing agent with which they are mixed. In this latter case, also, if the temperature is inadvertently or purposely carried to such a point that a portion of the bicarbonate of soda contained in the vessel is decomposed, it can again be converted into bicarbonate, after the purification is completed, by passing over or through the bulk a current of carbonic acid at a lower temperature, preferably, however, containing a slight amount of moisture to replace any of the water of combination that may have been carried away by the heat to which the bicarbonate has been subjected.

I am aware that bicarbonate of soda has been prepared by passing carbonic acid over crystallized mono-carbonate, and that the salt has been dried by passing a stream of heated carbonic-acid gas through it; but this forms no part of my invention, as the bicarbonate of soda to be treated by my process is manufactured by the ammonia process, and is already in a dry state.

I claim—

The herein-described process for the purification and removal of ammonia and organic coloring-matter existing in bicarbonate of soda manufactured by the ammonia process, which consists in passing or drawing a current of carbonic acid over or through dry bicarbonate of soda while under heat and pressure.

W. J. MENZIES.

Witnesses:
CHAS. H. MOCATTA,
JNO. HALLOWELL.